(12) United States Patent
Ryan

(10) Patent No.: US 9,164,770 B2
(45) Date of Patent: Oct. 20, 2015

(54) AUTOMATIC CONTROL OF MULTIPLE ARITHMETIC/LOGIC SIMD UNITS

(75) Inventor: Patrick D. Ryan, Yorba Linda, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1550 days.

(21) Appl. No.: 12/592,365

(22) Filed: Nov. 23, 2009

(65) Prior Publication Data

US 2011/0099352 A1    Apr. 28, 2011

Related U.S. Application Data

(60) Provisional application No. 61/279,669, filed on Oct. 23, 2009.

(51) Int. Cl.
  G06F 9/38      (2006.01)
  G06F 9/32      (2006.01)
  G06F 15/80     (2006.01)

(52) U.S. Cl.
  CPC .............. *G06F 9/325* (2013.01); *G06F 9/3885* (2013.01); *G06F 9/3887* (2013.01); *G06F 15/80* (2013.01)

(58) Field of Classification Search
  None
  See application file for complete search history.

(56) References Cited

U.S. PATENT DOCUMENTS

| 5,555,428 | A  | * | 9/1996  | Radigan et al. ................ 712/22 |
| 6,079,008 | A  | * | 6/2000  | Clery, III ....................... 712/11 |
| 7,146,486 | B1 | * | 12/2006 | Prokopenko et al. .......... 712/22 |
| 2004/0044885 | A1 | | 3/2004 | Zou |
| 2004/0158691 | A1 | * | 8/2004 | Redford ......................... 712/13 |
| 2008/0141004 | A1 | * | 6/2008 | Kershaw et al. ............. 712/220 |

FOREIGN PATENT DOCUMENTS

WO    WO 02/39271    5/2002

\* cited by examiner

*Primary Examiner* — Jacob A Petranek
(74) *Attorney, Agent, or Firm* — Farjami & Farjami LLP

(57) ABSTRACT

There is provided a method of performing single instruction multiple data (SIMD) operations. The method comprises storing a plurality of arrays in memory for performing SIMD operations thereon; determining a total number of SIMD operations to be performed on the plurality of arrays; loading a counter with the total number of SIMD operations to be performed on the plurality of arrays; enabling a plurality of arithmetic logic units (ALUs) to perform a first number of operations on first elements of the plurality of arrays; performing the first number of operations on first elements of the plurality of arrays using the plurality of ALUs; decrementing the counter by the first number of operations to provide a remaining number of operations; and enabling a number of the plurality of ALUs to perform the remaining number of operations on second elements of the plurality of arrays.

18 Claims, 3 Drawing Sheets

Fig. 3

| | A | B | C |
|---|---|---|---|
| 302 | 1 | 1 | 1 |
| | 2 | 2 | 2 |
| | 3 | 3 | 3 |
| | 4 | 4 | 4 |
| | 5 | 5 | 5 |
| | 6 | 6 | 6 |
| | 7 | 7 | 7 |
| | 8 | 8 | 8 |
| | 9 | 9 | 9 |
| 304 | ... | ... | ... |
| 308 | N | N | N |

US 9,164,770 B2

AUTOMATIC CONTROL OF MULTIPLE ARITHMETIC/LOGIC SIMD UNITS

RELATED APPLICATIONS

This application claims priority from U.S. Provisional Application No. 61/279,669, filed Oct. 23, 2009, which is hereby incorporated by reference in its entirety.

BACKGROUND OF THE INVENTION

1. Field of the Invention

The present invention relates generally to processing systems and, more specifically to processing systems with multi-core processing systems.

2. Background Art

Single instruction multiple data (SIMD) architectures, for example SIMD digital signal processor architectures, have an arithmetic logic unit (ALU) for performing operations on arrays stored in memory. SIMD architectures can also have a plurality of ALUs for performing the same or similar operations to accelerate the execution of an instruction. For example, in an SIMD architecture using M ALUs, if an instruction calls for two arrays of N elements to be added together, the instruction can execute M operations per iteration. Thus, an instruction can be performed M times faster then using a single ALU to perform operations.

However, when N is not an integer multiple of M, one iteration will require less then M ALUs. Conventional SIMD architectures use code generated by a compiler or written in assembly code to address the case when N is not an integer multiple of M. For example, code can change array size such that all iterations have M elements by adding elements to arrays. However, such code is complex and introduces additional overhead. These problems can become more significant as more ALUs are provided. For example, as SIMD architectures provide more ALUs, it is more common that N is not an integer multiple of M. Furthermore, complex code must account for the additional scenarios presented by additional ALUs.

Thus, there is a need in the art for a means to perform operations in SIMD architectures having a plurality of ALUs that can, for example, handle cases where N is not an integer multiple of M, without the need for complex code or additional overhead associated with conventional means.

SUMMARY OF THE INVENTION

There is provided an automatic control of multiple arithmetic/logic SIMD units, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 shows a diagram of an array set being operated on in the multi-core system of FIG. 1, according to one embodiment of the present invention.

DETAILED DESCRIPTION OF THE INVENTION

The present invention is directed to circuits and methods for performing SIMD operations in SIMD architectures having a plurality of ALUs. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
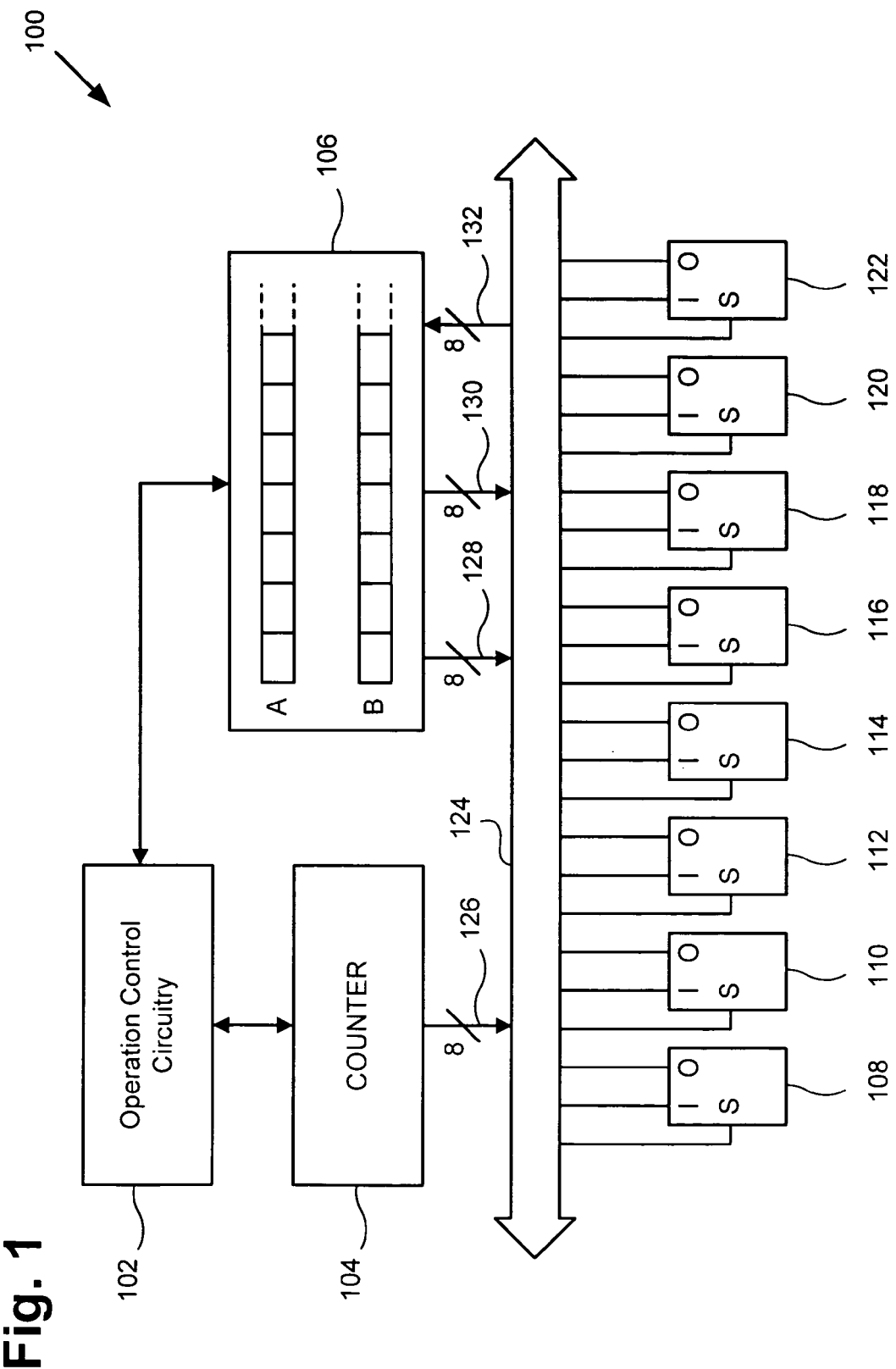
FIG. 1 shows a diagram of an exemplary multi-core system, according to one embodiment of the present invention.

Referring to FIG. 1, an exemplary circuit for performing SIMD operations is shown. In FIG. 1, SIMD operation circuit 100 includes, among other elements not shown, operation control circuitry 102, counter 104, memory 106, ALUs 108, 110, 112, 114, 116, 118, 120, and 122 (hereinafter "plurality of ALUs 108-122"), and data buses 124, 126, 128, 130, and 132. SIMD operation circuit 100 can comprise circuitry for performing logical instructions using arrays in a digital signal processor. Furthermore, SIMD operation circuit 100 can execute the same or similar operations on a plurality of arrays stored in memory, for example in memory 106. SIMD operation circuit 100 can also perform SIMD operations using the plurality of ALUs 108-122 without requiring additional overhead or that complex compiler code be generated or assembly code be written.

In FIG. 1, operation control circuitry 102 is configured to control SIMD operations in SIMD operation circuit 100. In SIMD operation circuit 100, operation control circuitry 102 is coupled to counter 104 and memory 106 and can control operations in SIMD operation circuit 100 using counter 104 and memory 106. For example, in an embodiment of the present invention, operation control circuitry 102 can control counter 104 by loading a total number of SIMD operations to be performed into counter 104.

Also shown in FIG. 1, memory 106 can store a plurality of arrays including arrays A and B. Each of the plurality of arrays A and B can comprise a plurality of elements. In SIMD operation circuit 100, arrays A and B can be stored in memory 106 for performing SIMD operations thereon. In SIMD operation circuit 100, memory 106 can supply elements from arrays A and B to plurality of ALUs 108-122 for performing SIMD operations thereon using data buses 128, 130, and 124. Furthermore, memory 106 is configured to store the results of SIMD operations on elements from arrays A and B using data buses 132 and 124.

In SIMD operation circuit 100, counter 104 can store a total number of SIMD operations to be performed in SIMD operation circuit 100. Furthermore, counter 104 can track a remaining number of SIMD operations to be performed in SIMD operation circuit 100. For example, counter 104 can track the remaining number of operations by decrementing a number of operations from the remaining number of operations. Also shown in FIG. 1, counter 104 is coupled to plurality of ALUs 108-122. In an embodiment of the present invention, counter 104 is configured to enable plurality of ALUs 108-122 for performing SIMD operations. For example, counter 104 can enable plurality of ALUs 108-122 using data buses 126 and 124 based on the remaining number of operations in SIMD operation circuit 100. In an embodiment of the present invention, counter 104 can also disable data paths associated with non-enabled plurality of ALUs 108-122 (not shown in FIG. 1).

Further shown in FIG. 1, SIMD operation circuit 100 includes a plurality of ALUs 108-122 for performing SIMD operations. For instance, the plurality of ALUs 108-122 can perform SIMD operations on elements in arrays A and B in memory 106 using data buses 124, 128, and 130. Each ALU in plurality of ALUs 108-122 has input I for receiving data. For example, in FIG. 1, ALU 110 can has input I for receiving data to perform SIMD operations thereon. In ALU 110, input I can receive an element from array A using data buses 128 and 124 and an element from array B using data buses 130 and 124. Furthermore, each ALU in plurality of ALUs 108-122 has output O for sending data. For example, in FIG. 1, ALU 110 has output O for sending results from a SIMD operation performed by ALU 110. Plurality of ALUs 108-122 can also store SIMD operation results in memory 106 using data buses 124 and 132. Each ALU in plurality of ALUs 108-122 can also be enabled using selector S. In FIG. 1, plurality of ALUs 108-122 can be selectively enabled by counter 104 using selector S and data bus 126. In an embodiment of the present invention, plurality of ALUs 108-122 can have associated data paths disabled by counter 104 (not shown in FIG. 1).

Figure 2:
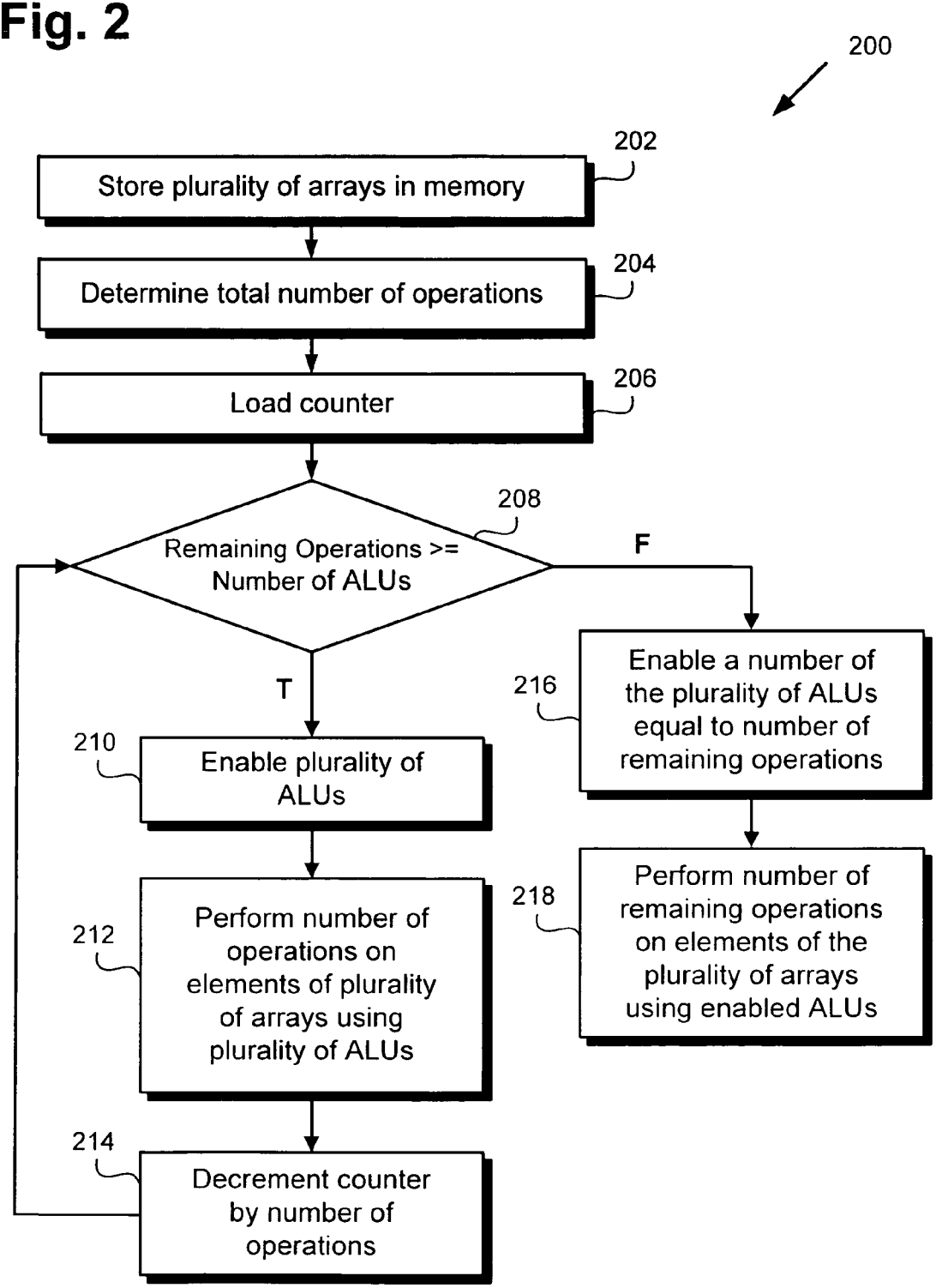
FIG. 2 is a flowchart presenting a method of providing an automatic control of multiple arithmetic/logic SIMD units, according to one embodiment of the present invention.

Referring now to FIG. 2, a flow chart illustrating a method according to an embodiment of the present invention is shown. Certain details and features have been left out of flowchart 200 that are apparent to a person of ordinary skill in the art. For example, data storage steps have been omitted so as to not obscure the invention. Also, registers can be used for holding data in flowchart 200. Additionally, a step may consist of one or more substeps, as known in the art. Steps 202 through 218 indicated in flowchart 200 are sufficient to describe an embodiment of the present invention. Furthermore, although flowchart 200 is described with respect to SIMD operation circuit 100, it is noted that the method is not limited to SIMD operation circuit 100. For example, flowchart 200 can be described with respect to circuits having a different number of ALUs than SIMD operation circuit 100 and circuits having varying components and configurations that still embody the present invention.

In step 202 in flowchart 200, a plurality of arrays are stored in memory for performing SIMD operations thereon. For example, SIMD operation circuit 100 has memory 106 for storing a plurality of arrays, such as, arrays A and B. Arrays A and B can be stored in memory 106 for performing SIMD operations thereon.

Also in flowchart 200, in step 204 a total number of SIMD operations to be performed on the plurality of arrays is determined. For example, in SIMD operation circuit 100, operation control circuitry 102 can determine a total number of SIMD operations to be performed on arrays A and B. In an embodiment of the present invention, operation control circuitry 102 can determine the total number of SIMD operations to be performed in SIMD operation circuit 100 from a computer instruction.

Referring to step 206 in FIG. 2, a counter is loaded with the total number of SIMD operations to be performed as determined in step 204. For example, in FIG. 1, operation control circuitry 102 can load counter 104 with the total number of SIMD operations to be performed in SIMD operation circuit 100 as determined by operation control circuitry 102 in step 204.

Flowchart 200 also has decision step 208 for determining whether a number of remaining operations is greater than or equal to the number of a plurality of ALUs. For example, in FIG. 1, counter 104 can determine whether a number of remaining operations is greater than or equal to eight, the number of ALUs in plurality of ALUs 108-122. Decision step 208 also has looping true path T used in a "true condition" and terminating false path F used in a "false condition." In decision step 208, a "true condition" is when the number of remaining operations is greater than or equal to the number of the plurality of ALUs and a "false condition" is when the number of remaining operations is not greater than or equal to the number of the plurality of ALUs. It should be noted that upon entering decision block 208 from step 206, the number of remaining operations is set equal the total number of SIMD operations to be performed as determined in step 204.

Also in FIG. 2, looping true path T has step 210 for enabling the plurality of ALUs. In step 210 the plurality of ALUs are enabled to perform a number of operations on elements of the plurality of arrays. For example, counter 104 can enable plurality of ALUs 108-122 for performing eight operations on elements from arrays A and B.

Looping true path T also has step 212 for performing the number of operations on elements of the plurality of arrays using the plurality of ALUs. For example, in SIMD operation circuit 100, enabled plurality of ALUs 108-122 can be used to perform eight operations on elements from arrays A and B.

In FIG. 2, Step 214 follows step 212 and decrements the number of remaining operations in the counter by the number of operations performed in step 212. For example, in SIMD operation circuit 100, counter 104 can decrement the number of remaining operations by eight. It will be appreciated that in the present invention, the position of step 214 is not limited by flowchart 200. For example, step 214 can be performed at any time in looping true path T.

Following step 214, in flowchart 200, looping true path T renters decision step 208 and can be repeated so long as there is a "true condition." In a "false condition," flowchart 200 enters terminating false path F. It will be appreciated that in flowchart 200, looping true path T can be entered many times or not at all and terminating false path F will be entered one time.

In FIG. 2, terminating false path F has step 216 for enabling a number of the plurality of ALUs equal to the number of remaining operations. For example, in SIMD operation circuit 100, counter 104 can enable a number of plurality of ALUs 108-122 equal to the number of remaining operations. In step 216, the number of plurality of ALUs that can be enabled is less than the number of plurality of ALUs. For example, in SIMD operation circuit 100, less than eight ALUs from plurality of ALUs 108-122 can be enabled.

Flowchart 200 terminates at step 218 where the number of remaining operations are performed on elements of the plurality of arrays using the ALUs enabled in step 216. For example, in SIMD operation circuit 100, the enabled plurality of ALUs 108-122 can perform the remaining operation on elements of arrays A and B. Following step 218 the there are no remaining SIMD operations to be performed from the total number of SIMD operations to be performed from step 204.

Figure 3:
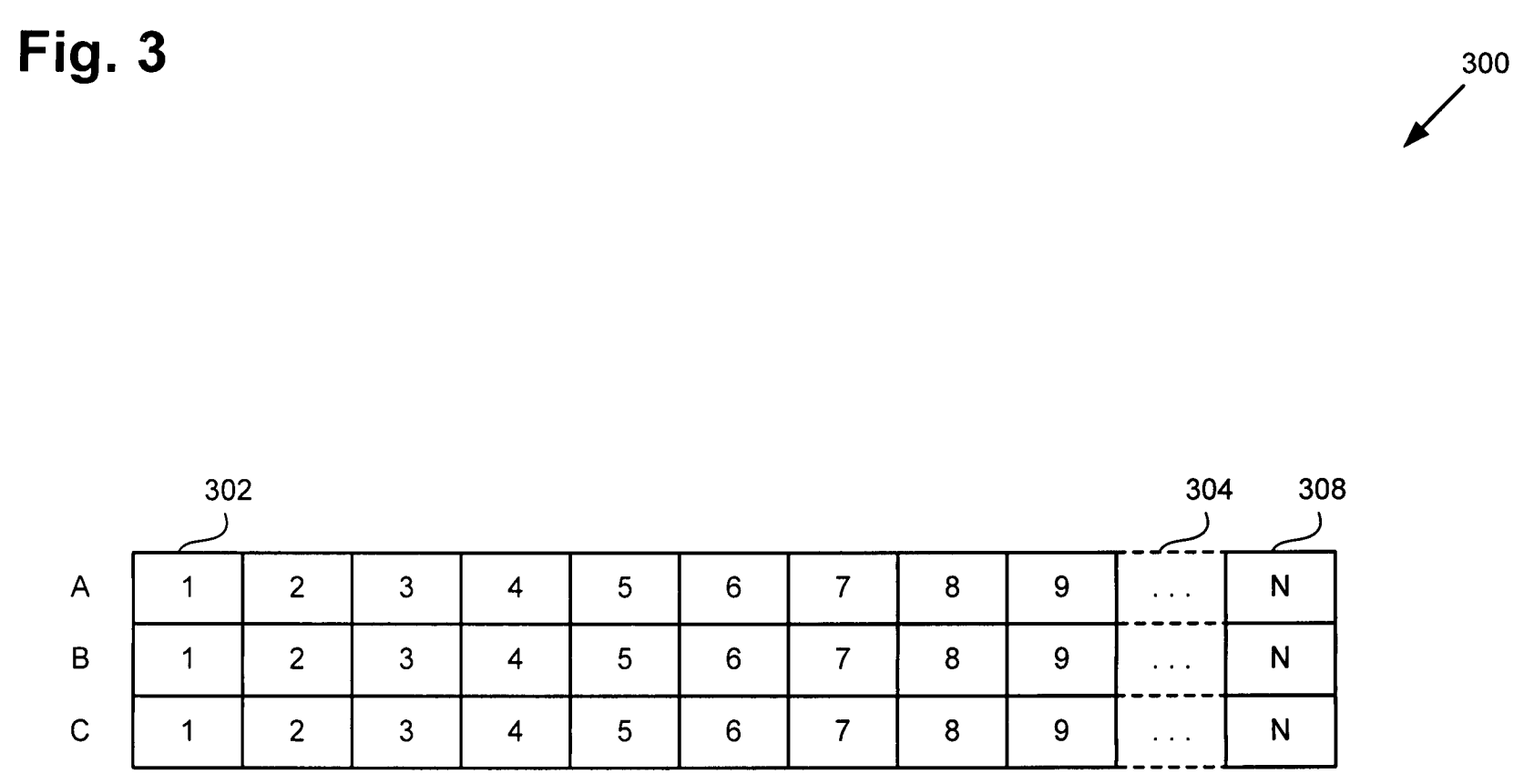

Referring to FIG. 3, array set 300 is shown. Array set 300 has arrays A and B, which can correspond to arrays A and B stored in memory 106 in FIG. 1. Array set 300 also has results array C, which can also be stored in memory 106. Array set 300 will be used to describe an example of the execution of a method in accordance with the present invention as illustrated in flowchart 200.

In FIG. 3, arrays A and B have N elements for performing SIMD operations thereon, each element represented by a marked block. For example, block 302, marked with a "1", represents a first element in array A and block 308, marked with an "N", represents the Nth element in array A. In describing examples of a method in accordance with the present invention, a particular element can be referenced by its position in an array, for example the first element of array A, represented by block 302, can be referenced as A[1] and the Nth element of array A, represented by block 308, can be referenced as A[N]. In array set 300, a block can represent many elements in an array, for example, dashed block 304 can represent all elements falling between A[9] and A[N].

In a method in accordance with the present invention, array set 300 can be stored in memory 106 in step 202. Arrays A and B can have "N" elements each where "N" is equal to seventeen. Thus, arrays A and B can have elements A[1] through A[17] and B[1] through B[17] respectively. In step 204, operation control circuitry 102 can determine that a total number of SIMD operations to be performed is equal to seventeen. Thus, in step 206, operation control circuitry 102 can load counter 104 such that the number of remaining operations stored in counter 104 is equal to seventeen prior to entering decision step 208. In decision step 208, seventeen remaining operations is greater than eight plurality of ALUs 108-122. Thus, flowchart 200 can enter looping true path T. In step 210, counter 104 can enable plurality of ALUs 108-122 and plurality of ALUs 108-122 can perform eight operations on elements in arrays A and B. More particularly, each of plurality of ALUs 108-122 can perform an operation using an element from array A an element from array B, for example, corresponding elements from A[1] through A[8] and B[1] through B[8]. Results from outputs O of plurality of ALUs 108-122 can be stored in C[1] through C[8] in memory 106.

In step 212, counter 104 can decremented by eight representing the number of operations performed in step 210. Thus, reentering decision step 208, the number of remaining operations can be equal to nine. Subsequently, flowchart 200 can reenter looping true path T and can perform similar operations as described above with respect to A[9] through A[16] and B[9] through B[16], storing results in C[9] through C[16]. Subsequently, counter 104 can be decremented by eight to have one. Thus, in decision step 208, the number of remaining operations can be equal to one, which is not greater than or equal to eight, the number of ALUs in plurality of ALUs 108-122. As such, flowchart 200 can enter terminating false path F. In step 216, counter 104 can enable one of plurality of ALUs 108-122, equal to the one remaining operation to be performed. For example, ALU 108 can be enabled to perform the remaining operation on A[17] and B[17] whereas plurality of ALUs 110-122 can be disabled. In step 218, ALU 108 can perform the one remaining operation leaving no remaining operations from the total number of operations determined in step 204.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

What is claimed is:

1. A method of performing single instruction multiple data (SIMD) operations, the method comprising:

storing a plurality of arrays in memory for performing SIMD operations thereon;

determining a total number of SIMD operations to be performed on the plurality of arrays, wherein a plurality of arithmetic logic units (ALUs) are less than the total number of SIMD operations;

loading a counter circuit with the total number of SIMD operations to be performed on the plurality of arrays;

the counter circuit enabling the plurality of ALUs to perform a first number of operations on first elements of the plurality of arrays;

performing the first number of operations on first elements of the plurality of arrays using the plurality of ALUs;

decrementing the counter circuit by the first number of operations to provide a remaining number of operations;

determining whether the remaining number of operations are less than the plurality of ALUs;

in response to determining that the remaining number of operations are less than the plurality of ALUs, the counter circuit enabling a number of the plurality of ALUs to perform the remaining number of operations on second elements of the plurality of arrays, wherein the number of the plurality of ALUs is the same as the remaining number of operations, and wherein other one or more of the plurality of ALUs are disabled by the counter circuit; and in response to determining that the remaining number of operations are not less than the plurality of ALUs, the counter circuit enabling the plurality of ALUs to perform the remaining number of operations on second elements of the plurality of arrays.

2. The method of claim 1, wherein each ALU of the plurality of arithmetic logic units includes a data path, and wherein a disabled ALU has a disabled data path.

3. The method of claim 2, wherein the data path of the disabled ALU is disabled using the counter circuit.

4. The method of claim 1, wherein the counter circuit enables the number of the plurality of ALUs.

5. The method of claim 1, wherein the counter circuit disables the other one or more of the plurality of ALUs.

6. The method of claim 1, wherein the SIMD operations are performed in a digital signal processor.

7. The method of claim 1, wherein the first number of operations performed on the first elements of the plurality of arrays are performed on corresponding elements among the plurality of arrays.

8. The method of claim 1, wherein the first number of operations is equal to the number of plurality of ALUs.

9. A circuit for performing single instruction multiple data (SIMD) operations, the circuit comprising:

a memory configured to store a plurality of arrays for performing SIMD operations thereon;

a plurality of arithmetic logic units (ALUs) configured to perform a first number of operations on first elements of the plurality of arrays;

a counter circuit;

an operation control circuitry configured to:

determine a total number of SIMD operations to be performed on the plurality of arrays, wherein the plurality of ALUs are less than the total number of SIMD operations;

load the counter circuit with the total number of SIMD operations to be performed on the plurality of arrays;

decrement the counter circuit by the first number of operations to provide a remaining number of operations; and determine whether the remaining number of operations are less than the plurality of ALUs;

wherein the counter circuit is configured to:

enable the plurality ALUs to perform the first number of operations on the first elements of the plurality of arrays; and in response to determining that the remaining number of operations are less than the plurality of ALUs, enable a number of the plurality of ALUs to perform the remaining number of operations on second elements of the plurality of arrays, wherein the number of the plurality of ALUs is the same as the remaining number of operations, and wherein other one or more of the plurality of ALUs are disabled; and in response to determining that the remaining number of operations are not less than the plurality of ALUs, enable the plurality of ALUs to perform the remaining number of operations on second elements of the plurality of arrays.

10. The circuit of claim 9, wherein the counter circuit is further configured to disable the other one or more of the plurality of ALUs.

11. The circuit of claim 9, wherein the plurality of ALUs include data paths, and wherein the counter circuit is configured to disable each of the data paths.

12. The circuit of claim 9, wherein the plurality of ALUs are configured to perform the first number of operations on the first elements of the plurality of arrays using corresponding elements among the plurality of arrays.

13. The circuit of claim 9, wherein the first number of operations is equal to the number of plurality of ALUs.

14. A digital signal processor (DSP) for performing single instruction multiple data (SIMD) operations, the DSP comprising:

a memory configured to store a plurality of arrays for performing SIMD operations thereon;

a plurality of arithmetic logic units (ALUs) configured to perform a first number of operations on first elements of the plurality of arrays;

a counter circuit;

an operation control circuitry configured to:

determine a total number of SIMD operations to be performed on the plurality of arrays, wherein the plurality of ALUs are less than the total number of SIMD operations;

load the counter circuit with the total number of SIMD operations to be performed on the plurality of arrays;

decrement the counter circuit by the first number of operations to provide a remaining number of operations; and determine whether the remaining number of operations are less than the plurality of ALUs;

wherein the counter circuit is configured to:

enable the plurality ALUs to perform the first number of operations on the first elements of the plurality of arrays; and in response to determining that the remaining number of operations are less than the plurality of ALUs, enable a number of the plurality of ALUs to perform the remaining number of operations on second elements of the plurality of arrays, wherein the number of the plurality of ALUs is the same as the remaining number of operations, and wherein other one or more of the plurality of ALUs are disabled; and in response to determining that the remaining number of operations are not less than the plurality of ALUs, enable the plurality of ALUs to perform the remaining number of operations on second elements of the plurality of arrays.

15. The DSP of claim 14, wherein the counter circuit is further configured to disable the other one or more of the plurality of ALUs.

16. The DSP of claim 14, wherein the plurality of ALUs include data paths, and wherein the counter circuit is configured to disable each of the data paths.

17. The DSP of claim 14, wherein the plurality of ALUs are configured to perform the first number of operations on the first elements of the plurality of arrays using corresponding elements among the plurality of arrays.

18. The DSP of claim 14, wherein the first number of operations is equal to the number of plurality of ALUs.

* * * * *